United States Patent
Jia

(10) Patent No.: US 10,205,802 B2
(45) Date of Patent: Feb. 12, 2019

(54) TRANSMISSION SYSTEM AND TRANSMISSION METHOD

(71) Applicant: INSTITUTE FOR INFORMATION INDUSTRY, Taipei (TW)

(72) Inventor: Wen-Kang Jia, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 71 days.

(21) Appl. No.: 15/610,645

(22) Filed: Jun. 1, 2017

(65) Prior Publication Data
US 2018/0352054 A1    Dec. 6, 2018

(51) Int. Cl.
H04L 29/06    (2006.01)
H04L 12/755   (2013.01)
H04L 29/12    (2006.01)

(52) U.S. Cl.
CPC ............ H04L 69/04 (2013.01); H04L 45/021 (2013.01); H04L 61/2007 (2013.01); H04L 69/22 (2013.01)

(58) Field of Classification Search
CPC ....... H04L 69/04; H04L 69/22; H04L 45/021; H04L 61/2007
See application file for complete search history.

(56) References Cited

U.S. PATENT DOCUMENTS

| | | | | |
|---|---|---|---|---|
| 6,704,866 B1 * | 3/2004 | Benayoun | ........... | H04L 63/0428 380/269 |
| 7,058,728 B1 * | 6/2006 | Eklund | ........... | H04L 29/06 370/474 |
| 8,094,549 B2 * | 1/2012 | Bae | ........... | H04L 47/10 370/229 |
| 8,140,709 B2 * | 3/2012 | Rochon | ........... | H04L 69/22 709/247 |
| 8,509,237 B2 * | 8/2013 | Akella | ........... | H04L 12/4625 370/389 |
| 9,307,442 B2 * | 4/2016 | Bachmann | ........... | H04L 69/04 |
| 2007/0070995 A1 * | 3/2007 | Pelletier | ........... | H04W 28/06 370/389 |
| 2008/0056273 A1 * | 3/2008 | Pelletier | ........... | H04L 69/04 370/395.21 |

(Continued)

OTHER PUBLICATIONS

Better Network Latency with End-to-End Header Compression in SDN Architecture, Supalerk Jivorasetkul et al, IEEE, 2013 (Year: 2013).*

*Primary Examiner* — Habte Mered
(74) *Attorney, Agent, or Firm* — CKC & Partners Co., Ltd.

(57) ABSTRACT

A transmission system and a transmission method are provided. The transmission system comprises a compressor, an intermediate terminal, and a decompressor. The compressor transmits an initial Internet Protocol package (IP package). The initial IP package comprised an initial forwarding table. The initial forwarding table records at least one candidate context identification (CID). The intermediate terminal receives the IP package and selects the at least one candidate CID different from an intermediate CID recorded in the intermediate terminal, so as to create an intermediate forwarding table. And, the intermediate terminal transmits an intermediate IP package. The decompressor receives the intermediate IP package. The decompressor selects the at least one candidate CID different from a decompressor CID recorded in the decompressor to be a target CID.

18 Claims, 3 Drawing Sheets

(56) References Cited

U.S. PATENT DOCUMENTS

| | | | |
|---|---|---|---|
| 2009/0154460 A1* | 6/2009 | Varela | H04L 69/04 370/392 |
| 2010/0202458 A1* | 8/2010 | Sato | H04W 28/06 370/392 |
| 2010/0226385 A1* | 9/2010 | Rochon | H04L 45/00 370/419 |
| 2012/0155375 A1* | 6/2012 | Zhu | H04B 7/155 370/315 |
| 2016/0337487 A1* | 11/2016 | Kwon | H04L 69/04 |

* cited by examiner

TRANSMISSION SYSTEM AND TRANSMISSION METHOD

BACKGROUND

Field of Invention

The present invention relates to a transmission system and a transmission method, and particularly to a transmission system and a transmission method for transmitting robust header compression package.

Description of Related Art

The long-term notorious problems of the communication industry is that the overhead of Transmission Control Protocol/Internet Protocol (TCP/IP). For example, the payload of the voice package is only 20 bytes when using the voice over IP (VoIP) to transmit the voice package and the voice is encoded by G.711 encode method. And, under the condition that the voice package uses the IPv4 header format to carry the voice package, the header column needs 74 bytes. It may cause 78% deadweight cost. On the other hand, it may cause 82% deadweight cost when the voice package uses the IPv6 header format to carry the voice package. As such, it is easy to occupy the valuable wireless network bandwidth and waste the bandwidth, without compressing the header content.

Therefore, it is a problem desired to be solved in the industry that how to provide an efficient transmission method and transmission system to compress the header.

SUMMARY

In order to solve the aforementioned problem, an aspect of the present invention provides a transmission system. The transmission system includes a compressor, an intermediate terminal and a decompressor. The compressor transmits an initial internet protocol (IP) package. The initial IP package comprises an initial forwarding table, and the initial forwarding table records at least one candidate context identification (CID). The intermediate terminal receives the initial IP package and selects the at least one candidate CID from the initial forwarding table to create an intermediate forwarding table, and transmits an intermediate IP package. The at least one candidate CID is different from an intermediate CID recorded in the intermediate terminal. The intermediate IP package comprises the intermediate forwarding table. The decompressor receives the intermediate IP package, selects the at least one candidate CID from the intermediate forwarding table to be a target CID. The at least one candidate CID is different from a decompressor CID recorded in the decompressor. The decompressor transmits the target CID to the intermediate terminal, the intermediate terminal transmits the target CID to the compressor, and the compressor transmits a robust header compression (ROHC) package according to the target CID.

Another aspect of the present invention provides a transmission method. The transmission method includes the following steps: transmitting an initial internet protocol (IP) package by a compressor; wherein the initial IP package comprises an initial forwarding table, and the initial forwarding table records at least one candidate context identification (CID); receiving the initial IP package and selecting the at least one candidate CID from the initial forwarding table to create an intermediate forwarding table, and transmitting an intermediate IP package by an intermediate terminal; wherein the at least one candidate CID is different from an intermediate CID recorded in the intermediate terminal; wherein the intermediate IP package comprises the intermediate forwarding table; receiving the intermediate IP package, selecting the at least one candidate CID from the intermediate forwarding table to be a target CID by a decompressor, wherein the at least one candidate CID is different from a decompressor CID recorded in the decompressor. The decompressor transmits the target CID to the intermediate terminal, the intermediate terminal transmits the target CID to the compressor, and the compressor transmits a robust header compression (ROHC) package according to the target CID.

Based on above, the invention of the transmission system and the transmission method can apply the target CID to successfully establish a new type of point-to-point compression method implementing between the compressor and decompressor, which are not connected directly. The transmission system and the transmission method avoid the deficiency that the inefficient traditional ROHC technology need to per-hop decompress and then compress repeatedly to transmit the ROHC package. As such, the invention improves the traditional ROHC technology and saves the time and the power consumption. Therefore, the invention achieves the effect of power efficiency when transmitting compressed package.

DETAILED DESCRIPTION

Figure 1:
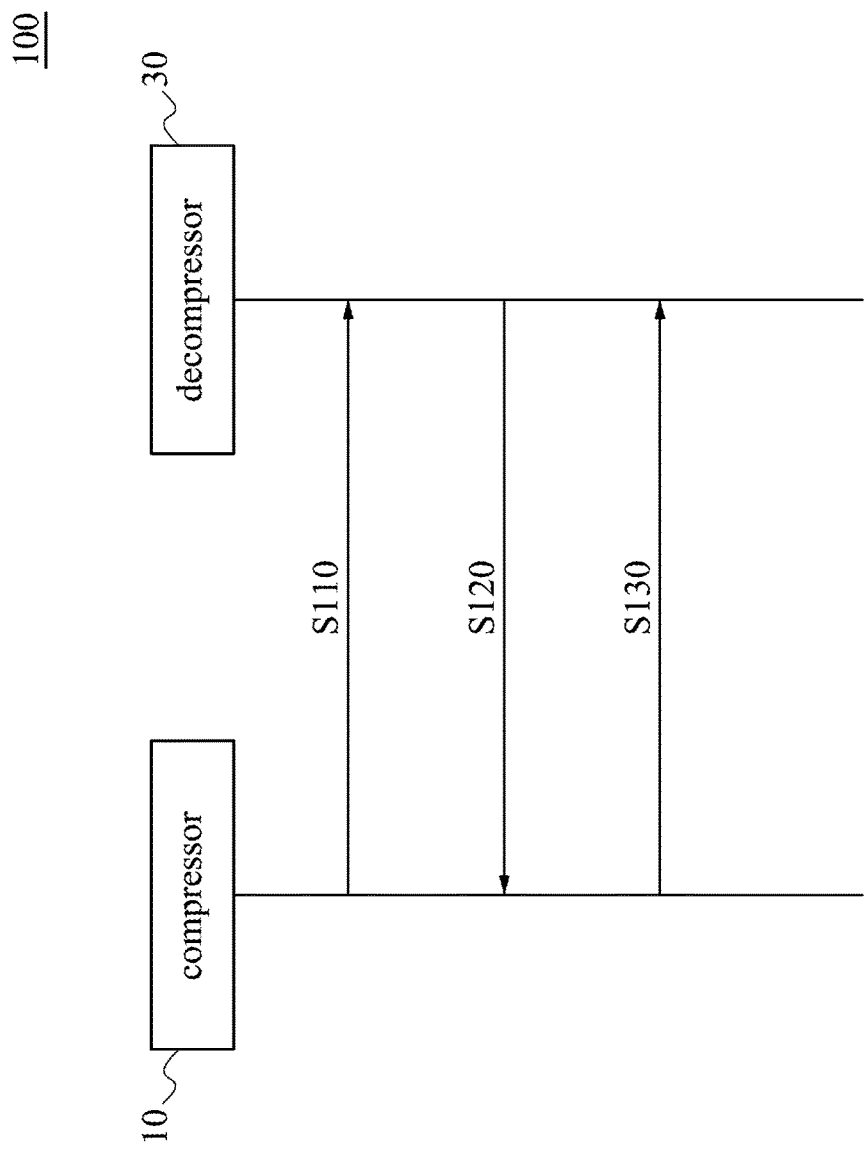
FIG. 1 illustrates a flow chart of a transmission method according to an embodiment of the present invention.

Reference will now be made in detail to the present embodiments of the disclosure, examples of which are illustrated in the accompanying drawings. However, the embodiments provided herein are intended as illustrative only since numerous modifications and variations therein will be apparent to those skilled in the art. Description of the operation does not intend to limit the operation sequence. Any devices resulting from recombination of components with equivalent effects are within the scope of the present disclosure. In addition, drawings are only for the purpose of illustration and not plotted according to the original size. Wherever possible, the same reference numbers are used in the drawings and the description to refer to the same or like parts for easy understanding.

As used herein, "the first", "the second", . . . etc. do not refer to the order or priority, nor are they intended to limit the disclosure. They are merely used to distinguish the devices or operations described with the same technical terms.

In general, when transmitting the continuous packages, these packages may have header columns (static columns) with the same contents of each other. For example, the unchanged contents during a same transmission session can include the port identification number, the data source, the initial position, the serial number, check code and/or the data length. Therefore, after transmitting the first package having the complete header, the subsequent packages only need to transmit the changed part (dynamic column) and the relation identification for identifying the order of the package recorded in header. In this way, the internet protocol (IP) header can be compressed to save large amount of wireless resource. Besides, in many kinds of the compressing IP header methods, the robust header compression (ROHC) method is an internet protocol standard defined by the internet engineering task force (IETF). The ROHC method is for reducing the huge network flows caused by the header transmission. The ROHC method is adopted by the long term evolution (LTE) as the only IP header compressing standard of the wireless air interface implementing between each base station and client device. The ROHC uses for improving the resource usage efficiency of the IP flow of the internet.

For example, referring to FIG. 1, FIG. 1 illustrates a flow chart of a transmission method 100 according to an embodiment of the present invention.

In step S110, the ROHC method begins when the IP data flow starts to transmit. The compressor 10 transmits the complete header (e.g., IP header which included the static column, the dynamic column and other parameters) of the first package, and the header of the first package is preserved in the data structure of the first compression context. The complete first package is transmitted to the decompressor 30.

In step S120, the decompressor 30 receives the first package and transmits a received message to the compressor 10, so as to inform compressor 10 that the decompressor 30 received the first package.

In step S130, the compressor 10 compresses the subsequent packages according to the content of the first compression context. For example, when the compressor 10 transmits the second package, the compressor 10 only preserves the changed part in the data structure of the second compression context (e.g., ROHC header). The second compression context does not need to record the complete IP header. In other words, if there is partial different content between the first package and the second package, the compressor 10 only transmits the context identification (CID) and the changed part of the value in the header column to the decompressor 30, without transmitting the complete header, so as to enhance the transmission efficiency.

Besides, the compressor 10 assigns a CID for the second package. The second package can be identified by the CID. The compressor 10 generates the ROHC package according to the CID and the ROHC header. And, the compressor 10 transmits the ROHC package to the decompressor 30. Besides, the compressor 10 assigns the different CIDs for the subsequent packages to identify each package. As mentioned in the steps S110-S130, during the coordinator of the compressor 10 and the decompressor 30, the compressor 10 firstly transmits a complete package to generate the CID. Next, the compressor 10 and the decompressor 30 identify the data content according to the CID(s), without transmitting the complete header (the compressor 10 replaces the IP header of each subsequent package to the ROHC header compressed by the ROHC method).

On the other hand, when the decompressor 30 receives the first package (step S110), the decompressor 30 stores the header of the first package and establishes a complete context. This complete context includes complete head and context messages. Therefore, in step S130, when the decompressor 30 receives the ROHC packages (which includes ROHC header) from the compressor 10, due to the ROHC header adopts the compress technology so that the redundant content of the header is not transmitted by the ROHC package. Therefore, for decompressing the ROHC packages, the decompressor 30 needs to know the original package (which is not compressed) having what header information.

In one embodiment, the ROHC method can send each package type corresponding to each package in the same time. Therefore, after the decompressor 30 receiving the ROHC package, the decompressor 30 can obtain the corresponding context message according to the package type and the CID. For example, the ROHC method can refer to the complete header (IP header) to obtain the difference between the ROHC header and the complete header (IP header) and then cover (or replace) the difference into the complete header (IP header) to decompress. For example, when the ROHC header of the ROHC package and the complete header (IP header) have different initial position, the decompressor 30 can cover the initial position of the ROHC header to the initial position of the complete header (IP header). Besides, other information can still quote from the complete header (IP header). Therefore, the decompressor 30 can decompress the columns of the ROHC headers in the ROHC package to recover the header of the ROHC package.

It should be noticed that these compressed ROHC packages cannot be processed as IP package. These compressed ROHC packages is tagged as special ROHC ether type (that is, the parameter of EtherType in compressed ROHC packages will be configured as ROHC format) to transmit in the second layer network link.

Besides, the design of the ROHC package is that the compressor 10 and the decompressor 30 should be link directly. In other words, the designed compression method of the ROHC package is point-to-point. For example, in the condition of the hop-to-hop of internet or mobile ad hoc network (MANET), the implementation of the ROHC method need to be end-to-end compression method. That is, the ROHC packages need to per-hop decompress and then compress repeatedly. It is very inefficient, and it cost large power consumption. In the condition of the internet, only few routers can play the role as the decompressor 30 of the ROHC method. Thus, it is hard to implement the scenario of per-hop compress/decompress when transmit the ROHC package from the compressor 10 to the decompressor 30 through multiple intermediate nodes.

Figure 2:
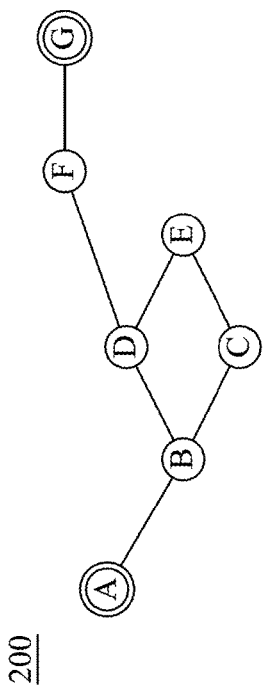
FIG. 2 illustrates a flow chart of transmission method according to an embodiment of the present invention.

For example, referring to FIG. 2, FIG. 2 illustrates a flow chart of transmission method 200 according to an embodiment of the present invention. As shown in FIG. 2, the nodes A-G are positioned in the hop-to-hop condition of the MANET. In this case, the implementation of the ROHC method needs to satisfied point-to-point compression method. That is, the ROHC packages need to per-hop decompress and then compress again. If node A is configured to transmits the ROHC package to the node G and the transmission method 200 predefined the transmission path is node A, B, D, F, G in order, the node A firstly transmits the ROHC package to the node B, and then the node B needs to decompress the ROHC package to obtain a package and search the forwarding table storing in the node B to obtain the transmission path for next node D. For example, this forwarding table storing in the node B records the IP address of node D. Then, the node B compresses the package by the CID between node B and node D to form the ROHC package again and transmits the ROHC package to node D according to the IP address of node D. Similarly, when node D receives the ROHC package, the node D need to decompress the ROHC package to obtain a package and search the forwarding table storing in the node D to obtain the transmission path for next node F. For example, this forwarding table storing in the node D records the IP address of node F. Then, the node D compresses the package by the CID between node D and node F to form the ROHC package again and transmits the ROHC package to node F according to the IP address of node F. Next, when node F receives the ROHC package, the node F executes the similar steps as previous statement. Finally, node F transmits the ROHC package to the node F. The nodes A-G can be the electronic device having the network transmission function.

As such, for implementing the ROHC method, it needs to per-hop decompress and then compress again. It is very inefficient, and it cost large power consumption. Therefore, a transmission method and a transmission system that can improve the transmission rate and save power are provided in the following paragraphs.

Figure 3:
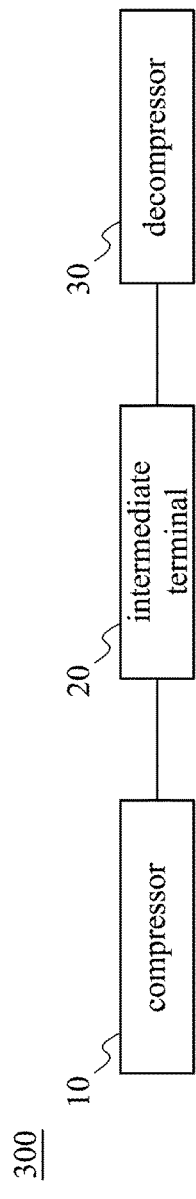
FIG. 3 illustrates a block diagram of a transmission system according to an embodiment of the present invention.

Referring to FIG. 3, FIG. 3 illustrates a block diagram of a transmission system 300 according to an embodiment of the present invention. The transmission system 300 includes a compressor 10, an intermediate terminal 20 and a decompressor 30. The compressor 10, the intermediate terminal 20 and the decompressor 30 can be the electronic device having the network transmission function. In one embodiment, the compressor 10, the intermediate terminal 20 and the decompressor 30 are configured in the same network interface.

In one embodiment, the compressor 10 transmits an IP package. The IP package includes an initial forwarding table. The initial forwarding table records at least one candidate CID. The at least one candidate CID can be represented as CID={10, 20, 30, 40}.

In one embodiment, the compressor 10 generates the at least one candidate CID by a random method. And, the compressor 10 adds the at least one candidate CID to an identification set. The initial forwarding table records the identification set (for example, CID={10, 20, 30, 40}).

Next, the intermediate terminal 20 receives the initial IP package and selecting the at least one candidate CID from the initial forwarding table. The at least one candidate CID is different from an intermediate CID recorded in the intermediate terminal 20.

In one embodiment, the intermediate CID recorded in the intermediate terminal 20 is represented as intermediate CID={40}. It means that the intermediate terminal 20 currently occupies intermediate CID={40} for transmitting other data. For example, the intermediate terminal 20 assigns intermediate CID={40} to transmit the transmission session data in the third party transmission path. In this moment, if the transmission system 300 still assigns using CID={40} in current transmission session, the intermediate IP package of the current transmission session and another IP package of the third party transmission path may correspond to the same CID={40}. It will cause the CID confliction, and the intermediate terminal 20 cannot make sure CID={40} correspond to which package. Therefore, when CID={40} currently is already occupying by the intermediate terminal 20, intermediate terminal 20 will not allow using CID={40} in the current transmission session. As such, the intermediate terminal 20 selects the at least one candidate CID, for example, selecting CID={10, 20, 30}, from the initial forwarding table (which includes CID={10, 20, 30, 40}). And, the at least one candidate CID (e.g., CID={10, 20, 30}) is different from the intermediate CID={40} recorded in the intermediate terminal 20. For example, the intermediate terminal 20 selects the at least one candidate CID={10, 20, 30} to create an intermediate forwarding table. Then, the information of at least one candidate CID={10, 20, 30} is recorded to the intermediate forwarding table. The intermediate terminal 20 also transmits an intermediate IP package, and the intermediate IP package comprises the intermediate forwarding table.

And next, the decompressor 30 receives the intermediate IP package, selects the at least one candidate CID from the intermediate forwarding table to be a target CID. And, the at least one candidate CID is different from a decompressor CID recorded in the decompressor 30.

For example, the decompressor 30 records that the decompressor CID is represented as CID={10, 20}. It means that the decompressor 30 is used in other transmission session of third party transmission path. Therefore, the decompressor 30 will not allow using CID={10, 20} in current transmission session. As such, the decompressor 30 selects the at least one candidate CID={30} from the intermediate forwarding table (which includes CID={10, 20, 30}). And, the at least one candidate CID={30} is different from a decompressor CID={10, 20} recorded in the decompressor 30. The at least one candidate CID={30} is configured be the target CID.

Next, the decompressor 30 transmits the target CID (that is, the message of CID={30}) to the intermediate terminal 20. The intermediate terminal 20 transmits the target CID to the compressor 10. In this manner, the compressor 10 can know that the CID={30} is not occupied by any node in the whole transmission path and the CID={30} can be used for identifying the ROHC package. Therefore, the compressor 10 can transmits the ROHC package according to the target CID={30}.

In one embodiment, the compressor 10 compresses a target IP package to the ROHC package according to the target CID={30}. Thus, when the compressor 10 transmits the ROHC package to the intermediate terminal 20, the intermediate terminal 20 does not need to decompress. The intermediate terminal 20 only need to transmit the ROHC package to the next intermediate node or the decompressor 30 according to the target CID (e.g., CID={30}) of the header of the ROHC package. For example, when the intermediate terminal 20 recognizes the target CID of the he ROHC package is CID={30}, the intermediate terminal 20 knows that it should directly transmit the ROHC package to the decompressor 30 by checking the table, without depressing the ROHC package.

Based on above, the target CID has to be unique established on the path connected by two nodes. As such, the target CID can use for identifying the corresponding ROHC package. Usually, in the per-hop MANET condition, the compressor 10 may connect to multiple intermediate terminals 20 and/or decompressor 30. The target CIDs of intermediate terminals 20 and/or decompressor 30 cannot be the same. Therefore, the above method can coordinate the target CIDs of the ROHC package satisfied the uniqueness when transmitting on the network interface.

In one embodiment, when the intermediate forwarding table does not exist any candidate CID, the intermediate terminal 20 transmits a conflict message to the compressor 10. When the compressor 10 receives the conflict message, the compressor 10 generates at least one updated candidate CID (e.g., CID={40, 53, 67}) and transmits another initial IP package, and the another initial IP package comprises another initial forwarding table. And, another initial forwarding table records the at least one updated candidate CID. Next, the decompressor 30 selects the at least one updated candidate CID from another forwarding table and the at least one updated candidate CID is different from an decompressor CID recorded in the decompressor 30.

Figure 4:
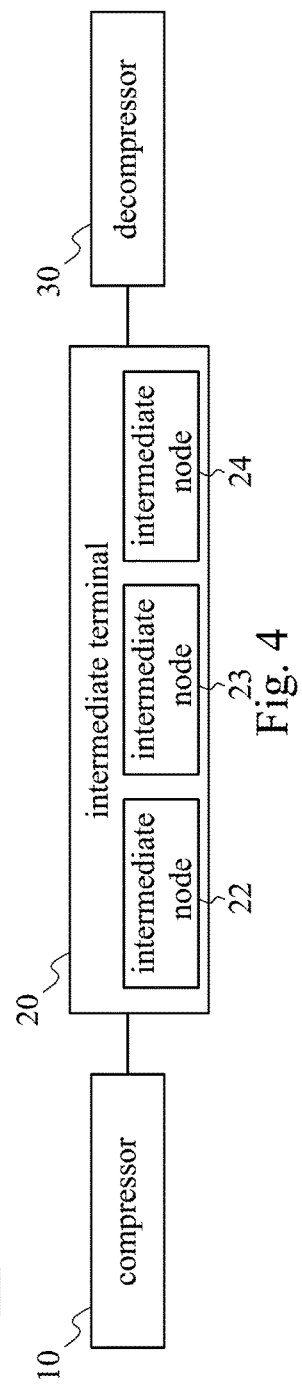
FIG. 4 illustrates a block diagram of a transmission system according to an embodiment of the present invention.
Figure 5:
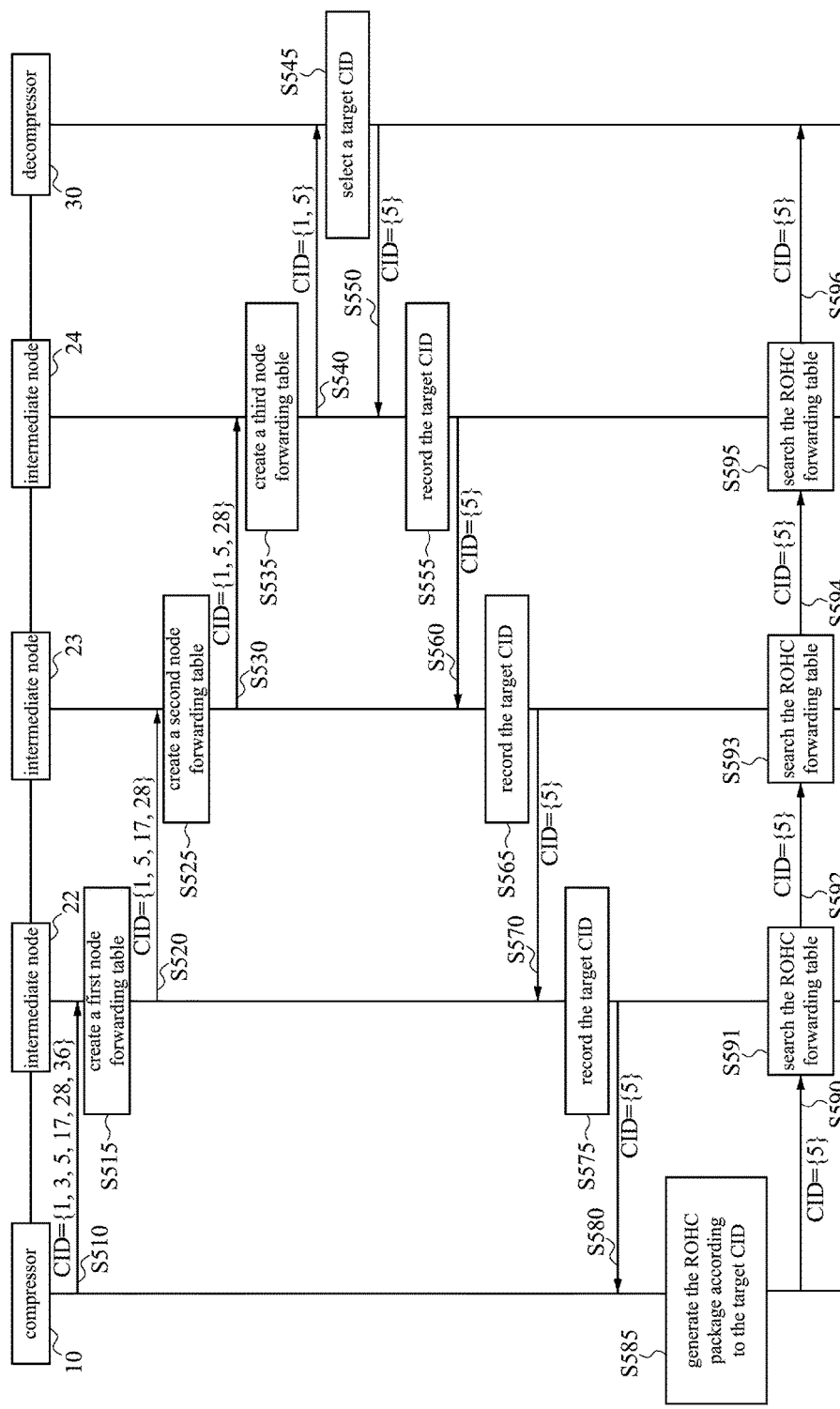
FIG. 5 illustrates a block diagram of a transmission system 500 according to an embodiment of the present invention.

Please refer to FIGS. 4-5, FIG. 4 illustrates a block diagram of a transmission system 400 according to an embodiment of the present invention. FIG. 5 illustrates a block diagram of a transmission system 500 according to an embodiment of the present invention. The transmission system 400 includes a compressor 10, intermediate nodes 22-24 and a decompressor 30. And, the intermediate terminal 20 includes intermediate nodes 22-24. In one embodiment, the router of each node in the transmission system 400 can determine the ROHC package transmits to the decompressor 30 sequentially through the intermediate nodes 22-24 according to the target address of the ROHC package. However, the determination method for each router selecting the suitable path to transmit package can be implemented by known technology. Thus, it does not further discuss herein.

In one embodiment, the transmission system 400 applies the offer-answer mode to make the path coordination faster. The compressor 10 generates multiple candidate CIDs, firstly. When these candidate CIDs transmits through one intermediate node (e.g., intermediate node 22), the transmission system 400 deletes the candidate CID which cannot be used and transmits the rest candidate CIDs which can be used to the next intermediate node (e.g., intermediate node 23). The path coordination can be bidirectional due to the path back and forth can be different. When the transmission system 400 can find a CID which does not be repeated or used along the transmission path, the compressor 10 and the decompressor 30 can adopt this CID to transmit the ROHC package.

Following further specifically describe the transmission method 500. Transmission method 500 can be implemented by transmission system 400. However, the intermediate nodes are not limited to three nods. The invention also can implement by the transmission system including at least two intermediate nodes or without any intermediate nodes.

In one embodiment, intermediate node 22 is coupled to the compressor 10. The intermediate node 22 uses for receiving the initial IP package and selecting the at least one candidate CID from the initial forwarding table to create a first node forwarding table, and transmitting an first node IP package. The at least one candidate CID is different from a first node CID recorded in the intermediate node 22. And, the first node IP package includes the first node forwarding table.

For example, in step S510, the compressor 10 transmits the initial IP package to the intermediate node 22. The initial IP package includes the initial forwarding table. The at least one candidate CID recorded in initial forwarding table is represented as CID={1, 3, 5, 17, 28, 36}. In step S515, if the intermediate node 22 records a first node CID is represented as CID={3, 36}, the intermediate node 22 selects the at least one candidate CID (e.g., CID={1, 5, 17, 28}) from the initial forwarding table to create a first node forwarding table. The at least one candidate CID={1, 5, 17, 28} is different from a first node CID={3, 36} recorded in the intermediate node 22. And, the first node forwarding table includes the information of the at least one candidate CID={1, 5, 17, 28}.

In one embodiment, the intermediate node 23 is coupled to the intermediate node 22. The intermediate node 23 uses for receiving the first node IP package and selecting the at least one candidate CID from the first node forwarding table to create a second node forwarding table, and transmitting a second node IP package. The at least one candidate CID is different from a second node CID recorded in the in second intermediate node. The second node IP package includes the second node forwarding table.

For example, in step S520, the intermediate node 22 transmits the first node IP package to the intermediate node 23. The first IP package includes the first node forwarding table. The at least one candidate CID recorded in first node forwarding table is represented as CID={1, 5, 17, 28}. In step S525, if the intermediate node 23 records a second node CID is represented as CID={17}, the intermediate node 23 selects the at least one candidate CID (e.g., CID={1, 5, 28}) from the first node forwarding table to create a second node forwarding table. The at least one candidate CID={1, 5, 28} is different from the second node CID={17} recorded in the intermediate node 23. And, the second node forwarding table includes the information of the at least one candidate CID={1, 5, 28}.

In one embodiment, third intermediate node 24 is coupled to the intermediate node 22 and the decompressor 30. The intermediate node 24 uses for receiving the second node IP package and selecting the at least one candidate CID from the second node forwarding table, to create a third node forwarding table, and transmitting a third node IP package. The at least one candidate CID is different from a third node CID recorded in the third intermediate node. And, the third node IP package includes the third node forwarding table.

For example, in step S530, the intermediate node 23 transmits the second node IP package to the intermediate node 24. The second IP package includes the second node forwarding table. The at least one candidate CID recorded in second node forwarding table is represented as CID={1, 5, 28}. In step S535, if the intermediate node 24 records a third node CID is represented as CID={28}, the intermediate node 24 selects the at least one candidate CID (e.g., CID={1, 5}) from the second node forwarding table to create a third node forwarding table. The at least one candidate CID={1, 5} is different from the third node CID={28} recorded in the intermediate node 24. And, the third node forwarding table includes the information of the at least one candidate CID={1, 5}.

In one embodiment, the decompressor 30 further receives the third node IP package, and selects the at least one candidate CID from third node forwarding table to be the target CID, and the at least one candidate CID is different from the decompressor CID recorded in the decompressor 30.

For example, in step S540, the intermediate node 24 transmits the third node IP package to the decompressor 30. The third IP package includes the third node forwarding table. The at least one candidate CID recorded in third node forwarding table is represented as CID={1, 5}. In step S545, if the decompressor 30 records a decompressor CID is represented as CID={1}, the decompressor 30 selects the at least one candidate CID (e.g., CID={5}) from the third node forwarding table to be the target CID. And, the target CID={5} is different from the decompressor CID={1} recorded in the decompressor 30.

In one embodiment, the decompressor 30 further transmits the target CID (e.g., CID={5}) to the intermediate node 24 (step S550), the intermediate node 24 records the target CID in the ROHC forwarding table of the intermediate node 24 (step S555). In one embodiment, the ROHC forwarding table of the intermediate node 24 can recite that the target CID is transmitted from the decompressor 30.

Next, the intermediate node 24 transmits the target CID (e.g., CID={5}) to the intermediate node 23 (step S560). The intermediate node 23 records the target CID in the ROHC forwarding table of the intermediate node 23 (step S565). In one embodiment, the ROHC forwarding table of the intermediate node 23 can recite that the target CID is transmitted from the intermediate node 24.

Next, the intermediate node 23 transmits the target CID (e.g., CID={5}) to the intermediate node 22 (step S570). The intermediate node 23 records the target CID in the ROHC forwarding table of the intermediate node 22 (step S575). In one embodiment, the ROHC forwarding table of the intermediate node 22 can recite that the target CID is transmitted from the intermediate node 23.

Next, the intermediate node 22 transmits the target CID (e.g., CID={5}) to the compressor 10 (step S580). The compressor 10 records the target CID in the ROHC forwarding table of the compressor 10 (in step S585). In one embodiment, the ROHC forwarding table of the intermediate node 22 can recite that the target CID is transmitted from the intermediate node 22.

Based on above, the compressor 10 can generate the ROHC package according to the target CID (step S585) and transmits the target CID to the intermediate node 22 (step S590). When the intermediate node 22 obtains that the target CID of the ROHC package is represented as CID={5}, the intermediate node 22 can search the ROHC forwarding table (step S591) to know that the ROHC package should be transmitted to the intermediate node 23. And then, the intermediate node 22 transmits the ROHC package to the intermediate node 23. When the intermediate node 23 obtains that the target CID of the ROHC package is represented as CID={5}, the intermediate node 23 can search the ROHC forwarding table (step S593) to know that the ROHC package should be transmitted to the intermediate node 24. And then, the intermediate node 23 transmits the ROHC package to the intermediate node 24. When the intermediate node 24 obtains that the target CID of the ROHC package is represented as CID={5}, the intermediate node 24 can search the ROHC forwarding table (step S595) to know that the ROHC package should be transmitted to the decompressor 30. And then, the intermediate node 24 transmits the ROHC package to the decompressor 30. When the decompressor 30 receives the ROHC package, the decompressor 30 decompresses the ROHC package according to the target CID, so as to recover a target IP package from the ROHC package.

Therefore, the intermediate terminal does not need to decompress and then compress the ROHC package. The intermediate terminal only need to transmit the ROHC package to the next intermediate node or the decompressor according to the target CID.

Based on above, the invention of the transmission system and the transmission method can apply the target CID to successfully establish a new type of point-to-point compression method implementing between the compressor and decompressor, which are not connected directly. The transmission system and the transmission method avoid the deficiency that the inefficient traditional ROHC technology need to per-hop decompress and then compress repeatedly to transmit the ROHC package. As such, the invention improves the traditional ROHC technology and saves the time and the power consumption. Therefore, the invention achieves the effect of power efficiency when transmitting compressed package.

Through the aforementioned technical solution, the flying manner of multiple aircraft formations can be controlled, and meanwhile the effect presenting device is driven to form a whole formation audio-visual effect. Furthermore, in the present invention the flying formation of the aircrafts is presented according to the settings of the flight script, and various audio-visual effects of these aircrafts are presented in the air. Additionally these aircrafts have the characteristic of being reusable, such that the environmental pollution is reduced and the cost is decreased.

What is claimed is:

1. A transmission system, comprising:
   a compressor for transmitting an initial internet protocol (IP) package; wherein the initial IP package comprises an initial forwarding table, and the initial forwarding table records at least one candidate context identification (CID);
   an intermediate terminal for receiving the initial IP package and selecting the at least one candidate CID from the initial forwarding table to create an intermediate forwarding table, and transmitting an intermediate IP package; wherein the at least one candidate CID is different from an intermediate CID recorded in the intermediate terminal; wherein the intermediate IP package comprises the intermediate forwarding table;
   a decompressor for receiving the intermediate IP package, selecting the at least one candidate CID from the intermediate forwarding table to be a target CID, wherein the at least one candidate CID is different from a decompressor CID recorded in the decompressor;
   wherein the decompressor transmits the target CID to the intermediate terminal, the intermediate terminal transmits the target CID to the compressor, and the compressor transmits a robust header compression (ROHC) package according to the target CID.

2. The transmission system of claim 1, wherein the compressor generates the at least one candidate CID by a random method, and the compressor adds the at least one candidate CID to an identification set, and the initial forwarding table records the identification set.

3. The transmission system of claim 1, wherein the compressor compresses a target IP package to the ROHC package according to the target CID.

4. The transmission system of claim 1, wherein the intermediate terminal further comprises:
   a first intermediate node, coupled to the compressor, the first intermediate node for receiving the initial IP package and selecting the at least one candidate CID different from the initial forwarding table to create an first node forwarding table, and transmitting a first node IP package; wherein the at least one candidate CID is different from a first node CID recorded in the first intermediate node; wherein the first node IP package comprises the first node forwarding table;
   a second intermediate node, coupled to the first intermediate node, the second intermediate node for receiving the first node IP package and selecting the at least one candidate CID from the first node forwarding table to create a second node forwarding table, and transmitting a second node IP package; wherein the at least one candidate CID is different from a second node CID recorded in the in second intermediate node; wherein the second node IP package comprises the second node forwarding table; and
   a third intermediate node, coupled to the second intermediate node and the decompressor, the third intermediate node for receiving the second node IP package and selecting the at least one candidate CID from the second node forwarding table, to create a third node forwarding table, and transmitting a third node IP package; wherein the at least one candidate CID is different from a third node CID recorded in the third intermediate node; wherein the third node IP package comprises the third node forwarding table;

wherein the decompressor further receives the third node IP package, and selects the at least one candidate CID from third node forwarding table to be the target CID; wherein the at least one candidate CID is different from the decompressor CID recorded in the decompressor.

5. The transmission system of claim 4, wherein the decompressor further transmits the target CID to the third intermediate node, the third intermediate node transmits the target CID to the second intermediate node, the second intermediate node transmits the target CID to the first intermediate node, the first intermediate node transmits the target CID to the decompressor, the decompressor generates and transmits the ROHC package according to the target CID.

6. The transmission system of claim 1, wherein decompressor receives the ROHC package and decompresses the ROHC package according to the target CID, so as to recover a target IP package from the ROHC package.

7. The transmission system of claim 1, wherein when the intermediate forwarding table does not exist any the at least one candidate CID, the intermediate terminal transmits a conflict message to the compressor.

8. The transmission system of claim 7, wherein when the compressor receives the conflict message, the compressor generates at least one updated candidate CID and transmits an another initial IP package, and the another initial IP package comprises an another initial forwarding table; wherein the another initial forwarding table records the at least one updated candidate CID.

9. The transmission system of claim 1, wherein the compressor, the intermediate terminal and the decompressor are configured in the same network interface.

10. A transmission method, comprising:
transmitting an initial internet protocol (IP) package by a compressor; wherein the initial IP package comprises an initial forwarding table, and the initial forwarding table records at least one candidate context identification (CID);
receiving the initial IP package and selecting the at least one candidate CID from the initial forwarding table to create an intermediate forwarding table, and transmitting an intermediate IP package by an intermediate terminal; wherein the at least one candidate CID is different from an intermediate CID recorded in the intermediate terminal; wherein the intermediate IP package comprises the intermediate forwarding table;
receiving the intermediate IP package, selecting the at least one candidate CID from the intermediate forwarding table to be a target CID by a decompressor, wherein the at least one candidate CID is different from a decompressor CID recorded in the decompressor;
wherein the decompressor transmits the target CID to the intermediate terminal, the intermediate terminal transmits the target CID to the compressor, and the compressor transmits a robust header compression (ROHC) package according to the target CID.

11. The transmission method of claim 10, further comprising:
generating the at least one candidate CID by a random method, and adding the at least one candidate CID to an identification set by the compressor; wherein the initial forwarding table records the identification set.

12. The transmission method of claim 10, further comprising:

compressing a target IP package to the ROHC package according to the target CID by the compressor.

13. The transmission method of claim 10, wherein the intermediate terminal further comprises, a first intermediate node, a second intermediate node and a third intermediate node, the transmission method further comprising:
receiving the initial IP package and selecting the at least one candidate CID different from the initial forwarding table to create an first node forwarding table, and transmitting a first node IP package by the first intermediate node; wherein the at least one candidate CID is different from a first node CID recorded in the first intermediate node; wherein the first node IP package comprises the first node forwarding table;
receiving the first node IP package and selecting the at least one candidate CID from the first node forwarding table to create a second node forwarding table, and transmitting a second node IP package by the second intermediate node; wherein the at least one candidate CID is different from a second node CID recorded in the in second intermediate node; wherein the second node IP package comprises the second node forwarding table; and
receiving the second node IP package and selecting the at least one candidate CID from the second node forwarding table, to create a third node forwarding table, and transmitting a third node IP package by the third intermediate node; wherein the at least one candidate CID is different from a third node CID recorded in the third intermediate node; wherein the third node IP package comprises the third node forwarding table;
wherein the decompressor further receives the third node IP package, and selects the at least one candidate CID from third node forwarding table to be the target CID; wherein the at least one candidate CID is different from the decompressor CID recorded in the decompressor.

14. The transmission method of claim 13, further comprising:
transmitting the target CID to the third intermediate node by the decompressor;
transmitting the target CID to the second intermediate node by the third intermediate node;
transmitting the target CID to the first intermediate node by the second intermediate node;
transmitting the target CID to the decompressor by the first intermediate node; and
generating and transmits the ROHC package according to the target CID by the decompressor.

15. The transmission method of claim 10, further comprising:
receiving the ROHC package and decompresses the ROHC package according to the target CID by the decompressor, so as to recover a target IP package from the ROHC package.

16. The transmission method of claim 10, wherein when the intermediate forwarding table does not have exist any the at least one candidate CID, the intermediate terminal transmits a conflict message to the compressor.

17. The transmission method of claim 16, wherein when the compressor receives the conflict message, the compressor generates at least one updated candidate CID and transmits an another initial IP package, and the another initial IP package comprises an another initial forwarding table; wherein the another initial forwarding table records the at least one updated candidate CID.

18. The transmission method of claim 10, wherein the compressor, the intermediate terminal and the decompressor are configured in the same network interface.

* * * * *